United States Patent [19]

Kato

[11] 3,727,921

[45] Apr. 17, 1973

[54] MAGNETIC RECORDING AND REPRODUCING APPARATUS OF THE SPIRAL TRACK TYPE

[75] Inventor: Saburo Kato, Ohta-ku, Tokyo, Japan

[73] Assignee: Ricoh Co., Ltd., Tokyo, Japan

[22] Filed: Oct. 27, 1971

[21] Appl. No.: 192,877

[30] Foreign Application Priority Data

Nov. 5, 1970 Japan ....................45/97444

[52] U.S. Cl. ....................274/4 J

[51] Int. Cl. ....................G11b 5/82, G11b 21/04

[58] Field of Search ....................179/100.2 T; 274/4 J

[56] References Cited

UNITED STATES PATENTS

| | | | |
|---|---|---|---|
| 3,046,357 | 7/1962 | Fujimoto | 274/4 J |
| 3,322,427 | 5/1967 | Fujimoto | 274/4 J |
| 2,782,263 | 2/1957 | Hoehn et al. | 274/4 R |

*Primary Examiner*—Harry N. Haroian
*Attorney*—Henry T. Burke et al.

[57] ABSTRACT

In apparatus for magnetically recording and/or reproducing information in a spiral track on a magnetic recording sheet, wherein the sheet is held in a fixed and downwardly facing position while a magnetic head is advanced by means including a turntable along a spiral inwardly directed path in contact with the sheet, mechanism for starting and stopping the turntable by successive depressions of a single button. The mechanism includes an actuation member movable between positions at which it respectively connects and disconnects the turntable and suitable drive means, and a slider connected to the button for moving the actuation member to a drive-connecting position on initial depression of the button, and unlocking the actuation member for return to drive-disconnecting position upon second depression of the button. The slider and actuation member are so arranged that the change from drive connection to disconnection occurs as the button is depressed. The apparatus further includes means for counting revolutions of the turntable, driven by an idler continuously in contact with the turntable, and means for automatically stopping the turntable upon completion of a recording or playback operation, as well as button-controlled means for effecting recording operation, and quick feed and reverse motion of the turntable.

10 Claims, 29 Drawing Figures

INVENTOR
SABURO KATO
BY Henry A. Burke
ATTORNEY

INVENTOR.
SABURO KATO
BY
Henry G. Burke
ATTORNEY

PATENTED APR 17 1973

3,727,921

SHEET 03 OF 11

INVENTOR.
SABURO KATO
BY
Henry T. Burke
ATTORNEY

INVENTOR.
SABURO KATO
BY Henry T. Burke
ATTORNEY

INVENTOR.
SABURO KATO
BY
Henry T. Burke
ATTORNEY

INVENTOR.
SABURO KATO
BY
Henry T. Burke
ATTORNEY

INVENTOR.
SABURO KATO
BY
Henry T. Burke
ATTORNEY

INVENTOR.
SABURO KATO
BY
Henry T. Burke
ATTORNEY

INVENTOR.
SABURO KATO
BY
Henry T. Burke
ATTORNEY

INVENTOR.
SABURO KATO
BY Henry T. Burke
ATTORNEY

INVENTOR.
SABURO KATO
BY
Henry T. Burke
ATTORNEY

MAGNETIC RECORDING AND REPRODUCING APPARATUS OF THE SPIRAL TRACK TYPE

BACKGROUND OF THE INVENTION

This invention relates to a magnetic recording and reproducing apparatus of the spiral track type in which information or sound is recorded and reproduced on a magnetic sheet by using a magnetic head adapted to execute spiral scanning.

Magnetic recording and reproducing apparatus of the spiral track type generally comprises a turntable supporting a magnetic head which moves spirally on the turntable so that it gradually shifts from the outer peripheral region of the turntable toward the center thereof while the turntable rotates. A plurality of pushbuttons are provided in the outer casing of the apparatus so that the turntable may be rotated or its rotation may be interrupted by depressing a suitable pushbutton. An operation for recording information or sound on a magnetic sheet placed on the turntable or reproducing the information or sound thus recorded may be performed simultaneously with carrying out control of the turntable by depressing a suitable pushbutton.

The aforesaid pushbuttons include a recording and reproducing pushbutton for effecting recording and reproducing of information or sound by rotating the turntable in the normal direction, a quick feed pushbutton for rotating the turntable at high speed in the normal direction, and a reverse rotation pushbutton for rotating the turntable at high speed in the reverse direction.

The recording and reproducing pushbutton is also used for interrupting the rotation of the turntable. More specifically, the rotation of the turntable is initiated when the recording and reproducing pushbutton is operated in a first depression operation, and its rotation is interrupted when the recording and reproducing pushbutton is operated in a second depression operation; i.e. successive depressions of that button alternately start and stop the rotation of the turntable.

The recording and reproducing pushbutton of conventional construction is such that the rotation of the turntable is not interrupted at once even if the button is depressed while recording or reproduction of information or sound is being carried out. That is, the rotation of the turntable is not interrupted till the finger depressing the button is moved away from the button and the button is restored to its original position. Thus, the prior art recording and reproducing pushbutton has a disadvantage in that difficulty is encountered in interrupting the rotation of the turntable at a desired moment, because the turntable rotates slightly during the period after the pushbutton is depressed, i.e. until the button is restored to its original position.

The time during which recording or playback is carried out is indicated by a counter disposed in the aforementioned outer case. Conventional counter means has hitherto had the disadvantage of misoperating to indicate a value which differs from the actual number of revolutions of the turntable.

SUMMARY OF THE INVENTION

An object of this invention is to provide a magnetic recording and reproducing apparatus of the spiral track type comprising pushbutton means which operates such that, when it is desired to interrupt rotation of the turntable, that end can be accomplished as soon as a recording and reproducing pushbutton is depressed without removing the finger from the pushbutton.

Another object of the invention is to provide a magnetic recording and reproducing apparatus of the spiral track type comprising a counter which accurately indicates the number of revolutions of the turntable.

Another object of the invention is to provide a magnetic recording and reproducing apparatus of the spiral track type comprising automatic stop means which automatically interrupts the rotation of the turntable when the magnetic head is restored to its original position upon completion of recording or playback.

The present invention may be embodied in recording and reproducing apparatus including means for holding a magnetic recording sheet in a fixed, downwardly facing position; a magnetic head disposed beneath the sheet for contact therewith; means, including a turntable, for advancing the head along an inwardly directed spiral path in contact with the sheet; a manually depressible button for stopping and starting the turntable; and means, including a driven member spaced from the turntable, for rotatably driving the turntable. In accordance with the invention, in an important specific aspect thereof, means are provided for connecting and disconnecting the turntable and driven member in response to successive depressions of the button. This means includes an actuation member operative to effect drive-transmitting connection of the driven member and turntable upon movement to a first position at which the actuation member locks, and to effect disconnection of the turntable from the driven member upon movement to a second position; and a slider, connected to the button, for engaging and pushing the actuation member to its first position upon initial depression of the button, and for releasing the locked actuation member for return to its second position upon the next successive depression of the button.

Specifically, upon release of the button after the initial depression, the slider is guided by an inclined edge portion of the displaced actuation member to a position different from the starting position of the slider. Upon the next depression of the button, the slider moves along a path different from its initial path, in a direction that unlocks the actuation member so as to disconnect the turntable from the drive during the inward stroke of the slider (i.e. as the button is being depressed the second time, rather than when the button is released after such depression); and when the button is thereafter released, the slider is restored to its original position.

In accordance with another feature of the invention, the connecting and disconnecting means includes an idler maintained in contact with the turntable at all times, but movable into and out of contact with the driven member of the drive means by movement of the actuation member between the aforementioned first and second positions. Further, there is provided a pulley having its axis disposed substantially on a straight line extending through the axes of the turntable and the idler, the pulley being driven by the idler through an endless belt. The pulley drives a means for counting the number of revolutions of the turntable. The described arrangement affords improved accuracy of counting because the counting means is driven by an idler which is always in contact with the turntable and hence responds to all angular movement of the turntable; the described substantial alignment of the turntable, idler, and pulley axes facilitates taking the drive for the counter from an idler always in contact with the turntable, i.e. by means of an endless belt, because the distance between idler and pulley remains substantially the same as the idler is moved into and out of contact with the drive means.

A still further feature of the invention resides in the provision of mechanism for automatically stopping the turntable at the conclusion of recording or playback.

The head-advancing means of the recording and reproducing apparatus includes means for progressively moving the head toward the center of the turntable as the turntable rotates, and means for restoring the head to its starting position near the periphery of the turntable after the head has completed a predetermined extent of inward movement. As a further feature of the invention, there is provided a mechanism, adapted to cooperate with the head-restoring means, for automatically stopping the turntable upon completion of a recording or playback operation. This mechanism includes a stop lever mounted on the under side of the turntable for pivotal motion from a first position to a second position incident to outward movement of the head by the head-recording means. The automatic stopping mechanism also includes a set lever pivotally mounted on stationary support structure and bearing on opposite ends, respectively, an actuation arm and an elongated plate spring. Upon completion of a playback or recording operation, as the head reaches the innermost point of its path of travel (and begins to be restored to its initial position by the restoring means), a pivoted member on the turntable is moved to a position for engaging the actuation arm to cause pivotal movement of the set lever as the turntable rotates; this pivotal motion carries the plate spring at the end of the set lever into a position at which the spring can be depressed to actuate a turntable-stopping switch. When the aforementioned stop lever is pivoted by the action of the head-restoring means, the stop lever reaches a position at which it depresses the plate spring to actuate the last-mentioned switch. Thus the table is halted upon restoration of the head to its initial position. The table-stopping switch may operate a solenoid having an arm arranged to unlock the actuation member of the means for connecting and disconnecting the turntable and driven member, described above, i.e. for permitting restoration of that actuation member (previously operated by depression of the button, as described) to its first position, at which the turntable is disconnected from the drive means.

Additional objects as well as features and advantages of this invention will become evident from the description set forth hereinafter when considered in conjunction with the accompanying drawings.

DETAILED DESCRIPTION

Figure 1:
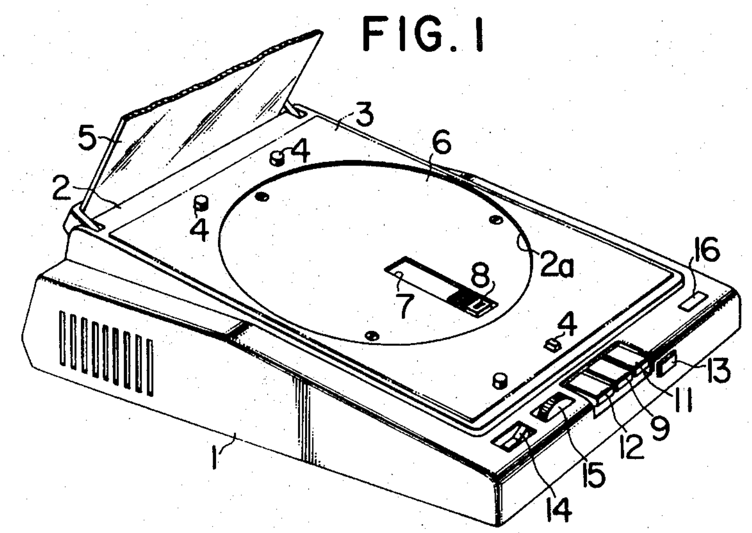
FIG. 1 is a perspective view of a magnetic recording and reproducing apparatus of the spiral track type comprising one embodiment of this invention.

The magnetic recording and reproducing apparatus of the spiral track type according to this invention shown in FIG. 1 comprises an outer case 1 having a top plate 2 on which a magnetic recording sheet 3 can be placed. Only the outline of the sheet 3 is shown in FIG. 1, to facilitate illustration of elements normally covered by the sheet, which extends over substantially the entire surface of top plate 2. Magnetic sheet 3 is held by three ruler pins 4 of relatively small length so as to be correctly positioned on top plate 2. A keep plate 5 of a transparent material is hingedly connected to one marginal portion of top plate 2 so as to hold magnetic sheet 3 in place on top plate 2 in which is formed a circular opening 2a of relatively large diameter having disposed therein a style disc 6 substantially integral with a turntable subsequently to be described. Style disc 6 is formed with a radial slot 7 through which extends outwardly a magnetic head 8 mounted in the turntable. Magnetic head 8 rotates together with the turntable and is gradually moved from the outer peripheral portion of the turntable toward the center thereof (by a feed screw, subsequently to be described) during its rotation along a spiral track or path. Thus, magnetic head 8 traces a spiral track in its rotation with the turntable and moves toward the central portion of the turntable. By bringing magnetic head 8 into contact with the recording and reproducing surface of magnetic sheet 3 and causing the same to slide therealong in a spiral track, it is possible to record and reproduce information on magnetic sheet 3.

In performing a recording or playback operation, rotation of the turntable can be initiated and interrupted by operating a recording and reproducing pushbutton 9. Quick feed of the turntable can be effected by operating a quick feed pushbutton 11, and the turntable can be rotated in the reverse direction by operating a reverse rotation pushbutton 12. A recording operation can be performed by depressing a recording pushbutton 13 as well as recording and reproducing pushbutton 9. Recording, playback, quick feed and reverse rotation operations which can be performed by operating the aforementioned buttons will subsequently be described with reference to the drawings illustrating various mechanisms. The numeral 14 refers to a power source switch, 15 a volume-adjusting knob, and 16 a counter for indicating the number of revolutions of the turntable.

If reproducing button 9 is operated in the first depression operation (i.e. if the button is depressed while the turntable is stationary), rotation of the turntable will be initiated by a mechanism subsequently to be described. If button 9 is operated in the second depression operation (i.e. if the button is depressed again, while the turntable is rotating), rotation of the turntable will be interrupted.

MAGNETIC HEAD-MOVING MECHANISM

Figure 2:
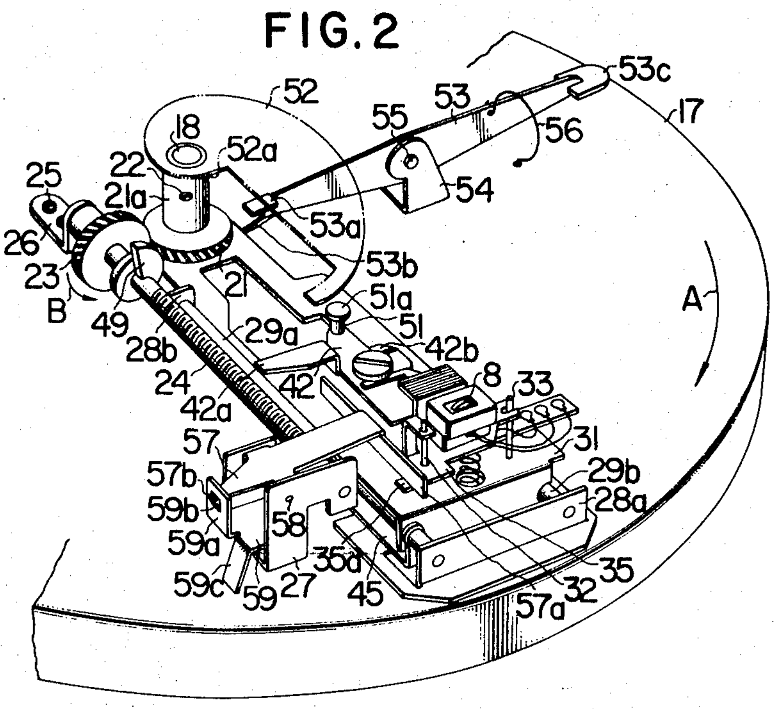
FIG. 2 is a perspective view showing essential portions of the head-moving mechanism of the magnetic recording and reproducing apparatus according to this invention.
Figure 3:
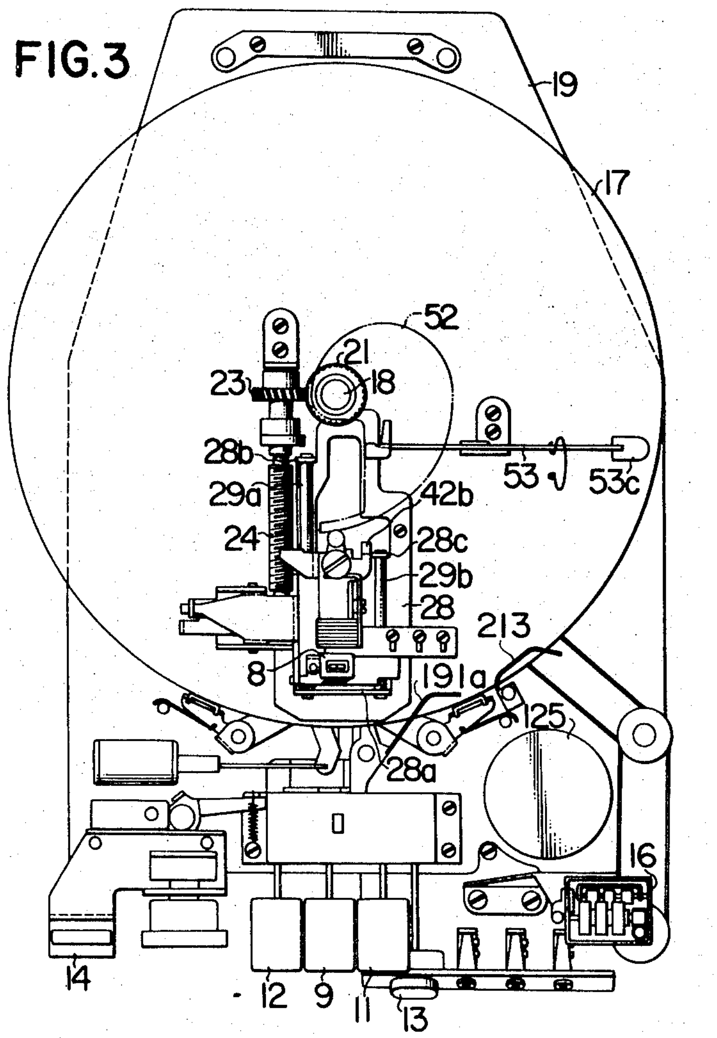
FIG. 3 is a plan view showing the main mounting plate for mounting principal component parts of the apparatus according to this invention, as it appears with the outer case of the apparatus removed.

In FIG. 2, a turntable 17 is rotatably supported by a shaft 18 which is secured, at its base, to a main mounting plate 19 shown in FIG. 3. Secured by a screw 22 threaded into a cylindrical body 21*a* is a helical gear 21 substantially integral with cylindrical body 21*a* which helical gear is maintained in meshing engagement with another helical gear 23. Helical gear 23 is secured to a feed screw 24 which is supported at one end thereof by a supporter 26 secured to turntable 17 by a screw 25 and at the other end thereof by another supporter 27, so that feed screw 24 is rotatably supported in a plane parallel to the horizontal surface of turntable 17.

Figure 4:
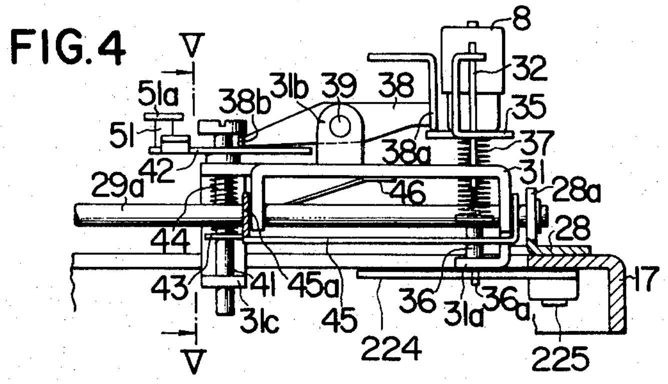
FIG. 4 is a side elevational view of the head-moving mechanism.

Turntable 17 is normally rotated in the direction of an arrow A as subsequently to be described. Rotation of turntable 17 results in helical gear 23 rotating in the direction of an arrow B. Two long and short guide rods 29*a* and 29*b* disposed parallel to each other extend between a rising portion 28*a* of a holder 28 secured to turntable 17 and other rising portions 28*b* and 28*c* of holder 28 shown in FIG. 3. As shown in FIGS. 2 and 4, a movable table 31 is slidably mounted on guide rods 29*a* and 29*b*. A magnetic head support plate 35 having magnetic head 8 secured thereto is loosely fitted for elevational motion over two guide rods 32 and 33 vertically mounted on movable plate 31.

Mounted between a support post 36 attached to a bent portion 31*a* of movable table 31 as shown in FIG. 4 and head support plate 35 is an expansion spring 37 which normally urges, by its biasing force, head support plate 35 to move upwardly. A lever 38 having a bent portion 38a positioned against head support plate 35 to preclude upward movement of magnetic head 8 is pivotally connected by a shaft 39 to a rising portion 31*b* of movable table 31. Lever 38 has another bent portion 38*b* which is brought by the biasing force of spring 37 into pressing engagement with an elevational plate 42 secured to a shaft 41. Shaft 41 is loosely received in openings formed in movable table 31 and a bent portion 31*c* thereof and normally urged to move downwardly by the biasing force of an expansion spring 44 mounted between movable table 31 and a flange 43 secured to shaft 41.

Mounted on guide rod 29*a* supporting movable table 31 is drive means 45 which holds the legs of movable table 31 therebetween as shown in FIG. 4. Drive means 45 includes an arm 45*a* shown in FIG. 5 which can be seen if the left end portion of drive means 45 shown in FIG. 4 is seen from the left. Arm 45*a* presses at one end 45*b* thereof, with a light force, against the flange 43 of shaft 41 by virtue of the biasing force of a needle spring 46 secured at its base to movable table 31. Arm 45*a* supports, at the other end thereof through a shaft 47, a roller 48 which engages, at one portion of its outer peripheral surface, feed screw 24 adapted to rotate in the direction of arrow B together with helical gear 23 as turntable 17 rotates in the direction of arrow A as shown in FIG. 2.

As feed screw 24 rotates, drive means 45 gradually moves away leftwardly in FIG. 4. That is, magnetic head 8 moves from the outer peripheral portion of turntable 17 toward the central portion thereof as the turntable rotates in FIG. 2, so that magnetic head 8 moves toward the center of turntable 17 while moving in a spiral track or path.

When movable table 31 supporting magnetic head 8 reaches near the center of turntable 17, a short arm 42*a* of elevational plate 42 is lifted in FIG. 2 by a cam 49 secured to rotating feed screw 24. Elevational plate 42 has attached thereto a shaft 51 having a flange 51*a* at its upper end. As elevational plate 42 is lifted as aforementioned by the action of cam 49, flange 51*a* engages a peripheral edge 52*a* of the base of a restoring plate 52 secured to shaft 18.

As elevational plate 42 is lifted and lever 38 pivots clockwise about shaft 39 in FIG. 4, the bent portion 38*a* of lever 38 moves head support plate 35 downwardly, thereby moving magnetic head 8 downwardly. As the movement of magnetic head 8 along a spiral path thus reaches its terminating point, magnetic head 8 is moved downwardly away from magnetic sheet 3. Shaft 41 secured to elevational plate 42 moves upwardly simultaneously as elevational plate 42 is lifted. At this time, arm 45 is pivoted clockwise about guide rod 29*a* in FIG. 5 by flange 43. As a result, roller 48 is released from engagement with feed screw 24, thereby releasing drive means 45 from the influence of feed screw 24.

Figure 5:
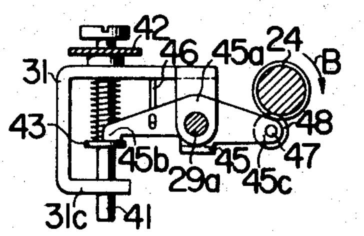
FIG. 5 is a sectional view taken along the line V—V of FIG. 4, with the head and other parts being omitted.

If turntable 17 rotates in the direction of arrow A in FIG. 2 while flange 51*a* substantially integral with elevational plate 42 engages peripheral edge 52*a* of restoring plate 52, flange 51*a* will gradually be moved outwardly along the increasingly protruding peripheral edge of restoring plate 52. As a result, magnetic head 8 returns to its starting position shown in FIG. 2 when the turntable has made substantially one complete revolution. As flange 51a is released from engagement with the restoring plate, the roller 48 of drive means 45 is brought into engagement with feed screw 24 again as shown in FIG. 5, and magnetic head 8 is restored to a height shown in FIG. 4.

When elevational plate 42 is pushed upwardly by the action of cam 49 in FIG. 2, a downwardly inclined bent portion 42*b* of elevational plate 42 scoops up a bent portion 53*a* of an operation lever 53 pivotally connected through a shaft 55 to a supporter 54 secured to turntable 17. Lever 53 has a leg 53*b* which is brought into pressing engagement with the surface of turntable 17 by the biasing force of a spring 56 mounted between turntable 17 and operation lever 53. Operation lever 53 is adapted to cause turntable 17 to stop rotating when magnetic head 8 is restored to its starting position shown in FIG. 2. Operation of lever 53 will be described in detail with reference to an automatic turntable stop mechanism subsequently to be described.

MAGNETIC HEAD-LOWERING MECHANISM

Figure 6:
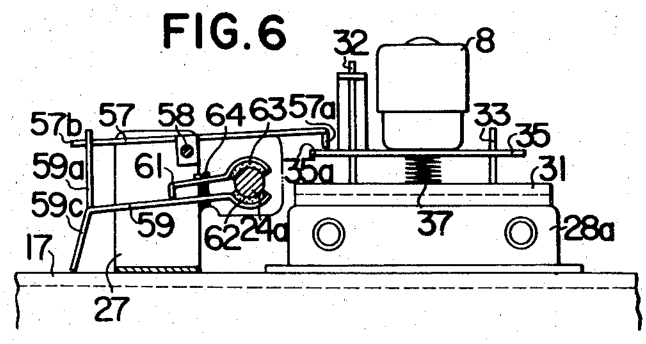
FIG. 6 is a front elevational view of the mechanism of FIG. 4.

When magnetic head 8 is restored to its starting position after completing its operation, the magnetic head is moved away from magnetic sheet 3 through the agency of lever 38 shown in FIG. 4 as aforementioned. Magnetic head 8 is also preferably moved away from magnetic sheet 3 when the former is moved in the reverse direction from any point as desired, in order to avoid wear of the magnetic head and damage to the magnetic sheet as well as to prevent noise production. FIG. 6 shows the magnetic head moved downwardly by friction means when the turntable is rotated in the reverse direction.

A pressing portion 57*a* of a release member 57 is spaced apart a small distance from a projecting portion 35*a* of head support plate 35 shown in FIG. 2. Release member 57 is pivotally supported through a shaft 58 by supporter 27 and has an end portion 57*b* disposed opposite to pressing portion 57*a* which end portion loosely extends through an opening 59*b* formed in a rising portion 59*a* of an actuation member 59 as shown in FIG. 2. Actuation member 59 and an auxiliary plate 61 are mounted on nonthreaded portion 24*a* of feed screw 24 through friction members 62 and 63. By adjusting a screw 64, it is possible to adjust the clamping force exerted by actuation member 59 on the nonthreaded portion 24a of feed screw 24.

When turntable 17 rotates in the direction of arrow A or clockwise in FIG. 2, the nonthreaded portion 24*a* of feed screw 24 rotates counterclockwise as seen in FIG. 6. This causes actuation member 59 to pivot counterclockwise about nonthreaded portion 24*a*. However, since a leg 59*c* of member 59 is positioned against the surface of turntable 17, actuation member 59 is held in the position shown in FIG. 6.

Figure 7:
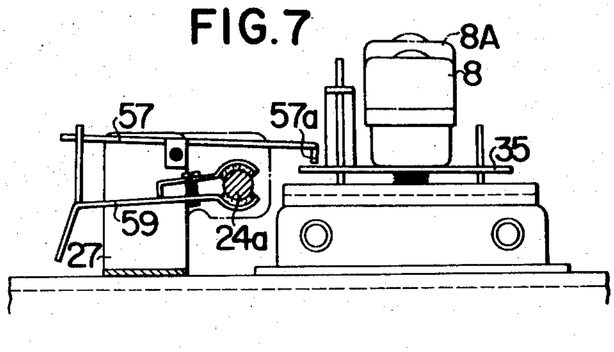
FIG. 7 is a front elevational view showing the mechanism for moving the head downwardly by friction means.

If the nonthreaded portion 24*a* of feed screw 24 is caused to rotate clockwise when the direction of rotation of turntable 17 is reversed, actuation member 59 will be pivoted counterclockwise by friction members 62 and 63, so that the rising portion 59*a* of member 59 causes release member 57 to pivot clockwise about shaft 58. As release member 57 pivots clockwise, head support plate 35 is moved downwardly by the pressing portion 57*a* of release member 57. As a result, magnetic head 8 moves downwardly from a dash-and-dot line position 8A to a solid line position in FIG. 7, so that magnetic head 8 is moved away from magnetic sheet 3 shown in FIG. 1 when turntable 17 is rotated in the reverse direction.

Figure 8:
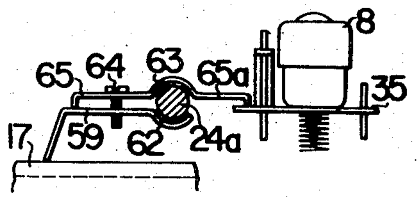
FIG. 8 is a similar view of another form of mechanism for moving the head downwardly by friction means.
Figure 9:
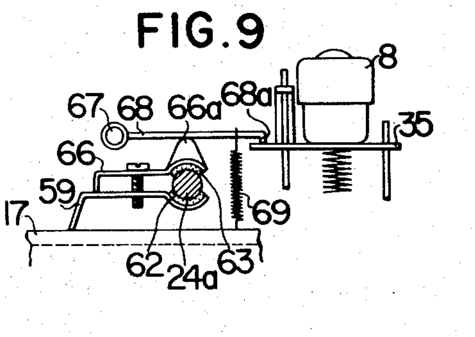
FIG. 9 is a similar view of a further example of mechanism for moving the head downwardly by friction means.

FIGS. 8 and 9 illustrate other forms of the mechanism for moving downwardly the magnetic head when the turntable is rotated in the reverse direction. Parts of the mechanism which function in a manner similar to the parts of the mechanism shown in FIG. 6 will be designated by like reference characters. As shown in FIG. 8, the provision of an auxiliary plate 65 having an arm 65*a* directly in contact with elevational plate 35 eliminates release member 57 shown in FIG. 6, thereby simplifying the construction of the mechanism.

The example shown in FIG. 9 comprises an auxiliary plate 66 having a projection 66*a* with which is maintained in contact a front end 68*a* of a release lever 68 pivotally connected through a shaft 67 to an immovable member (not shown) mounted on the turntable. Release lever 68 is normally urged to pivot clockwise by the biasing force of a compression spring 69 connected at one end thereof to turntable 17 and at the other end thereof to lever 68. When actuation member 59 pivots clockwise in the same manner as described with reference to FIG. 6, release lever 68 moves in slaved relation to the projection 66*a* of auxiliary plate 66 and pivots clockwise too. In the mechanism shown in FIG. 9, the amount of downward movement of elevational plate 35 during the pivotal movement of actuation member 59 is selected by adjusting the length of release lever 68 and the position of projection 66*a*.

Figures 10, 12, 13:
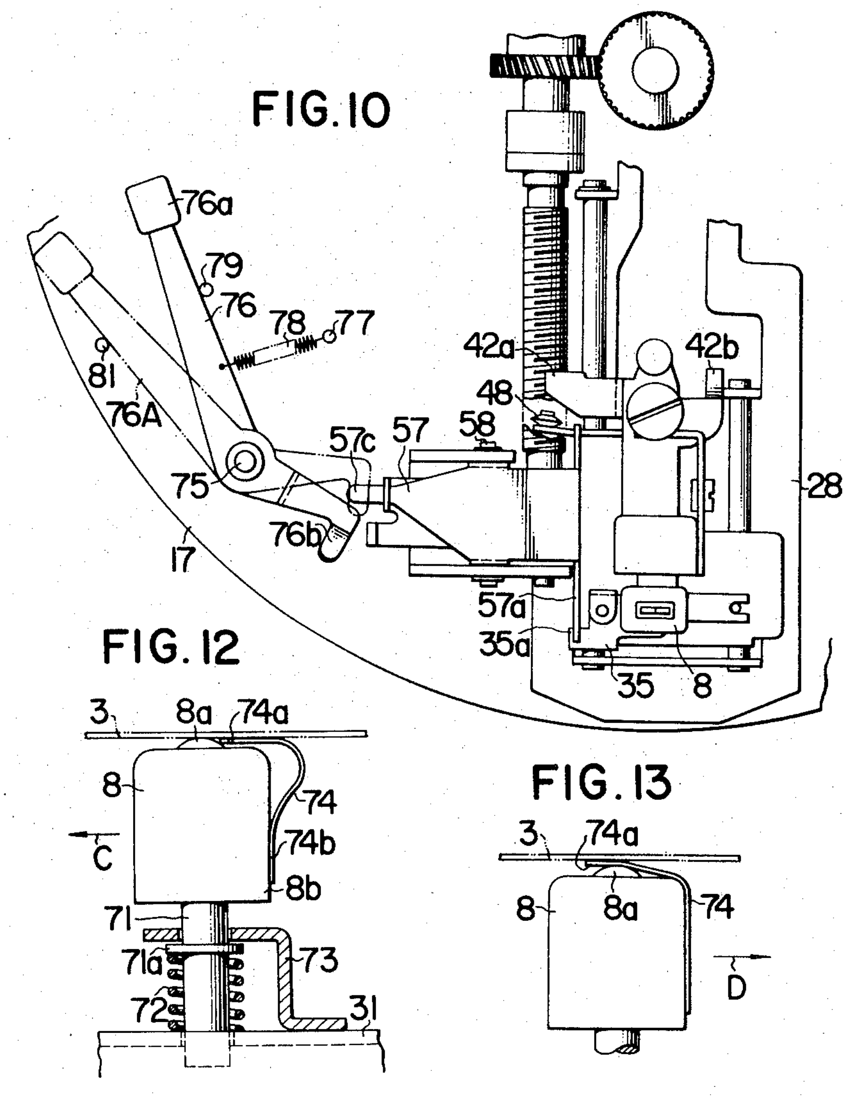
FIG. 10 is a plan view of the head-lowering mechanism which is effective to move the head downwardly by a centrifugal force.
FIG. 12 is a front elevational view of the head provided with a thin shield strip for a magnetic sheet.
FIG. 13 is a side elevational view of the head of FIG. 12 with the thin shield strip interposed between the head and magnetic sheet.

The mechanism shown in FIG. 12 is adapted to move magnetic head 8 away from magnetic sheet 3 without using actuation member 59 and release member 57 when the direction of rotation of turntable 17 is reversed. A shaft 71 to which magnetic head 8 is secured loosely extends through an opening formed in movable table 31, and an expansion spring 72 is mounted between a flange 71a secured to shaft 71 and movable plate 31. Magnetic head 8 is held in the position shown by a support plate 73 secured to movable table 31.

A thin shield strip 74 made of Mylar or other similar material which has a low coefficient of friction and substantial resilience is secured at a base 74b thereof to one side 8a of magnetic head 8. Thin shield strip 74 has a free end portion 74a which is disposed between magnetic sheet 3 and the upper end portion of magnetic head 8 as shown in FIG. 12. When turntable 17 rotates clockwise or in the direction of arrow A in FIG. 2, and magnetic head 8 moves in the direction of arrow C, the free end portion 74a of thin shield strip 74 is kept out of engagement with a top 8a of magnetic head 8 as shown in FIG. 12. When magnetic head 8 moves in the direction of an arrow D as turntable 17 rotates in the reverse direction, the free end portion 74a of thin shield strip 74 disposed between magnetic sheet 3 and magnetic head 8 is brought into contact with the top 8a of magnetic head 8, so that magnetic head 8 is prevented from coming into direct contact with magnetic sheet 3.

Figure 14:
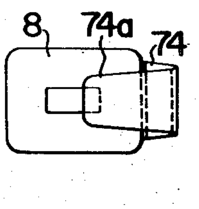
FIG. 14 is a plan view of the structures illustrated in FIG. 13.
Figure 11:
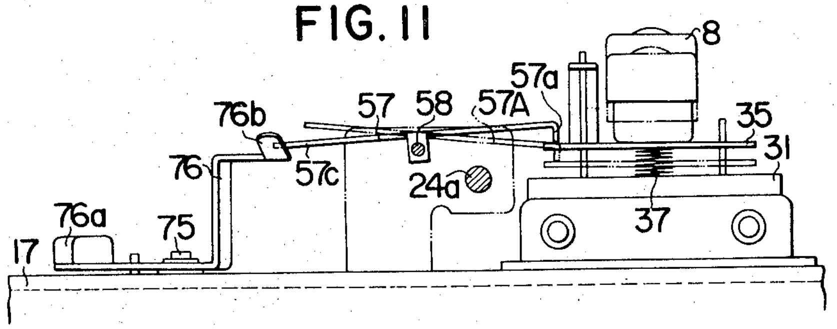
FIG. 11 is a front elevational view of FIG. 10.

Downward movement of magnetic head 8 by the action of friction means shown in FIG. 6 to FIG. 9, and engagement and disengagement of magnetic head 8 with magnetic sheet 3 by the action of thin shield strip 74 shown in FIG. 12 to FIG. 14, take place only when turntable 17 rotates in the reverse direction. When turntable 17 is rotated at high speed and magnetic head 8 is moved quickly, magnetic head 8 is moved away from magnetic sheet 3 by a centrifugal force-responsive mechanism shown in FIGS. 10 and 11. Parts of the mechanism for carrying the centrifugal force process into practice which are similar in function to the parts of mechanism shown in FIG. 6 are designated by like reference characters.

In FIG. 10, an actuation member 76 is pivotally connected through a shaft 75 to turntable 17 and normally urged to pivot clockwise about shaft 75 by the biasing force of a compression spring 78 connected at one end thereof to a pin 77 attached to turntable 17 and at the other end thereof to actuation member 76. A stopper 79 attached to turntable 17 is intended to prevent pivotal movement of actuation member 76 caused by the biasing force of spring 78, and a stopper 81 is for limiting the range of pivotal movement of actuation member 76.

Actuation member 76 has a weight 76a secured to one free end thereof, and is formed at the other free end thereof with an actuator 76b which is bent obliquely upwardly from actuation member 76. Generally, turntable 17 rotates at higher speed when the magnetic sheet is fed quickly or rotated in the reverse direction than when information or sound is recorded thereon or reproduced therefrom in a recording and reproducing apparatus, so that the centrifugal force acts on various parts on turntable 17. If turntable 17 rotates at high speed, the centrifugal force acting on weight 76a will get the better of the biasing force of spring 78 exerted on actuation member 76, with the result that actuation member 76 pivots to a dash-and-dot line position 76A in FIG. 10. This pivotal movement of actuation member 76 results in actuator 76b scooping up a projection 57c of release member 57, so that the release member pivots about shaft 58 to a dash-and-dot line position 57A shown in FIG. 11 and moves head support plate 35 downwardly. Thus, the mechanism relying on the centrifugal force as aforementioned is effective to move magnetic head 8 away from magnetic sheet 3 when the turntable is fed quickly as well as rotated in the reverse direction. This is conducive to prevention of wear which would otherwise be caused on the surface of the magnetic sheet and production of noises which would otherwise be caused to occur in quick feed or reverse rotation of the turntable.

The description set forth so far refers to the behavior of magnetic head 8 during rotation of turntable 17 and the operation of restoring magnetic head 8 to its starting position. The mechanism for operating the turntable adapted to be actuated by depressing the recording and reproducing button will now be explained.

OPERATION OF THE TURNTABLE DURING RECORDING AND PLAYBACK

Figure 15:
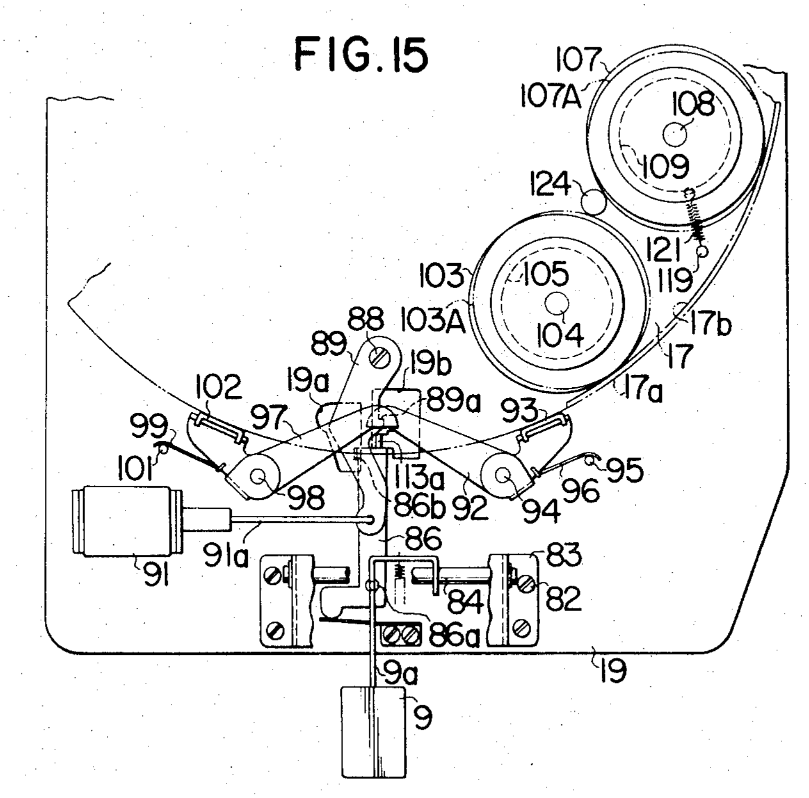
FIG. 15 is a plan view of the turntable-operating mechanism.
Figures 16, 17:
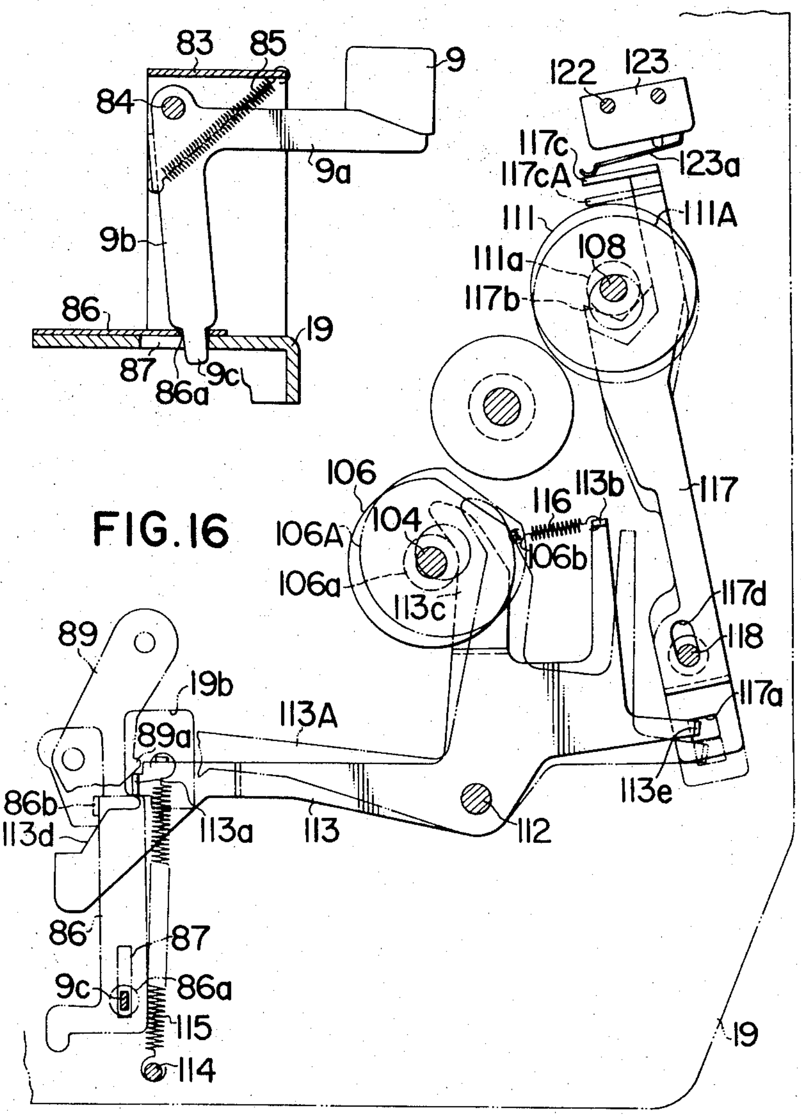
FIG. 16 is a further plan view of the turntable operating mechanism.
FIG. 17 is a side view of a pushbutton.

In FIG. 15, a shaft 84 is connected to a button-mounting member 83 secured to main mounting plate 19 by screws 82. A lever 9a for recording and reproducing button 9 is pivotally connected to shaft 84 as shown in FIG. 17. Button 9 is normally urged to pivot counterclockwise about shaft 84 by the biasing force of a compression spring 85 connected at one end thereof to mounting member 83 and at the other end thereof to a leg 9b of button 9 as shown in FIG. 17.

Leg 9b extends at its lower end portion 9c through an opening 86a formed in a slider 86 placed on main mounting plate 19 to be received in a slot 87 formed in main mounting plate 19.

If recording and reproducing button 9 is depressed downwardly in FIG. 17, slider 86 will move leftwardly in sliding motion or upwardly in FIG. 15. As shown in FIG. 15, main mounting plate 19 is formed therein with openings 19a and 19b, with a bent portion 86b of slider 86 extending through opening 19a to be disposed below the underside of main mounting plate 19. An actuator 91a for a releasing solenoid 91 is connected to a free end of a locking member 89 pivotally connected through a shaft 88 to main mounting plate 19. Locking member 89 is normally urged to pivot counterclockwise about shaft 88 by the biasing force of a spring (not shown).

A brake shoe 93 secured to a brake 92 is maintained in pressing engagement with an outer peripheral edge 17a of turntable 17 as shown in FIG. 15. Brake 92 is pivotally connected to the main mounting plate through a shaft 94, and normally urged to pivot counterclockwise by the biasing force of a torsion spring 96 connected at one end thereof to a pin 95 attached to main mounting plate 19 and at the other end thereof to brake 92. Another brake 97 which forms a set with brake 92 is pivotally connected to main mounting plate 19 through a shaft 98, and maintained in pressing engagement with the outer peripheral edge 17a of turntable 17 by the biasing force of a torsion spring 99 connected at one end thereof to a pin 101 attached to main mounting plate 19.

Two washers 105 and 106 shown in FIG. 16 which are disposed on the upper surface and underside of main mounting plate 19 respectively are mounted on a shaft 104 rotatably supporting an idler 103. Shaft 104 is held in position on main mounting plate 19 by the washers 105 and 106 loosely holding main mounting plate 19 therebetween. Likewise, two washers 109 and 111 shown in FIG. 16 are mounted on a shaft 108 supporting an idler 107 so as to hold idler 107 in place on main mounting plate 19. Shafts 104 and 108 extend through relatively large openings (not shown) formed in the main mounting plate for permitting idlers to move to dash-and-dot positions 103A and 107A respectively.

FIG. 16 shows a mechanism mounted on the underside of main mounting plate 19. An actuation member 113 mounted on main mounting plate 19 through a shaft 112 is normally urged to pivot counterclockwise about shaft 112 by the biasing force of a compression spring 115 connected at one end thereof to a pin 114 attached to the main mounting plate and at the other end thereof to actuation member 113.

Actuation member 113 is formed at its left end with a bent portion 113*a* which extends through an opening 19*b* formed in main mounting plate 19 to be disposed above the upper surface of plate 19. A boss 106*a* secured to washer 106 is urged to press against an arm 113*c* of actuation member 113 by the biasing force of a compression spring 116 connected at one end thereof to a bent portion 113*b* of member 113 and at the other end thereof to a bent portion 106*b* of washer 106.

Actuation member 113 is formed at its right end with a bent portion 113*e* which is fitted loosely in an opening 117*a* formed in another actuation member 117 which is mounted on main mounting plate 19 through a shaft 118 loosely fitted in a slot 117*d*. A boss 111a secured to washer 111 is urged to press against a recess 117*b* formed in member 117 by the biasing force of a compression spring 121 connected at one end thereof to the main mounting plate and at the other end thereof to a bent portion 109*a* of washer 109. Actuation member 117 is also formed at its forward end with a bent portion 117*c* which is maintained in contact with an actuator 123*a* of a switch 123 for a drive motor secured to main mounting plate 19 by screws 122.

Figure 18:
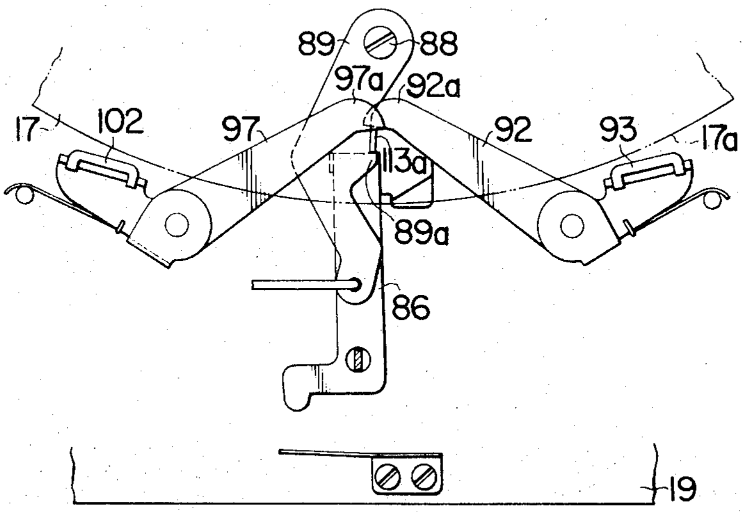
FIG. 18 is a plan view showing a portion of the turntable control mechanism comprising a slider.

In FIG. 17, if recording and reproducing button 9 is depressed, slider 86 will move upwardly in FIG. 15 so as to thereby move upwardly bent portion 113*a* of actuation member 113. At this time, bent portion 113*a* is locked by lock member 89 as shown in FIG. 18 after pushing an offset portion 89*a* of lock member 89 to cause member 89 to slightly pivot clockwise. While this locking operation is being performed, free ends 92*a* and 97*a* of brakes 92 and 97 respectively are pushed and moved upwardly by bent portion 113*a* of actuation member 113 as shown in FIG. 18, so that brake shoes 93 and 102 move away from the outer peripheral surface 17*a* of turntable and the brake forces acting on turntable 17 are removed.

As actuation member 113 pivots from its solid line position to its dash-and-dot line position 113A in FIG. 16, actuation member 117 moves downwardly, and washer 106 mounted on shaft 104 and washer 111 mounted on shaft 108 move to dash-and-dot line positions 106A and 111A respectively. Accordingly, idler 103 mounted on shaft 104 and idler 107 mounted on shaft 108 move to dash-and-dot line positions 103A and 107A, respectively. Idler 103 is maintained in contact with an inner peripheral surface 17*b* of turntable 17 at all times, while idler 107 comes into contact with inner peripheral surface 17*b* only when actuation member 117 shown in FIG. 16 operates. Idlers 103 and 107 are brought into pressing engagement with a capstan 124 when they move to positions 103A and 107A, respectively, as aforementioned.

Capstan 124, which is driven by an electric motor 125 shown in FIG. 3 and a belt (not shown), rotates counterclockwise when the magnetic sheet rotates in the normal direction in recording, playback and quick feed operations. Rotation of electric motor 125 is started or interrupted by means of the aforementioned switch 123 shown in FIG. 16. When bent portion 117*c* of actuation member 117 moves to a dash-and-dot line position 117*c*A, an actuator 123*a* of switch 123 moves in slaved relationship to actuate motor 125.

Operation of the actuation mechanism which is performed when recording and reproducing button 9 is operated in the first depression operation will be summarized here. Upon depression of button 9, actuation member 113 is locked by locking member 89 in a place to which it has pivoted in FIG. 16. Actuation member 117, which is coupled to actuation member 113, also moves so as to actuate switch 123 for electric motor 125. Capstan 124 is rotated as electric motor 125 is actuated, and idlers 103 and 107 are brought into pressing contact with rotating capstan 124 so as to rotate turntable 17 clockwise in FIG. 15. As turntable 17 rotates, magnetic head 8 shown in FIG. 2 moves toward the center of the turntable as it moves in a spiral path to carry out recording and playback of information or sound as aforementioned.

EXPLANATION OF SLIDER 86

Figures 19, 28:
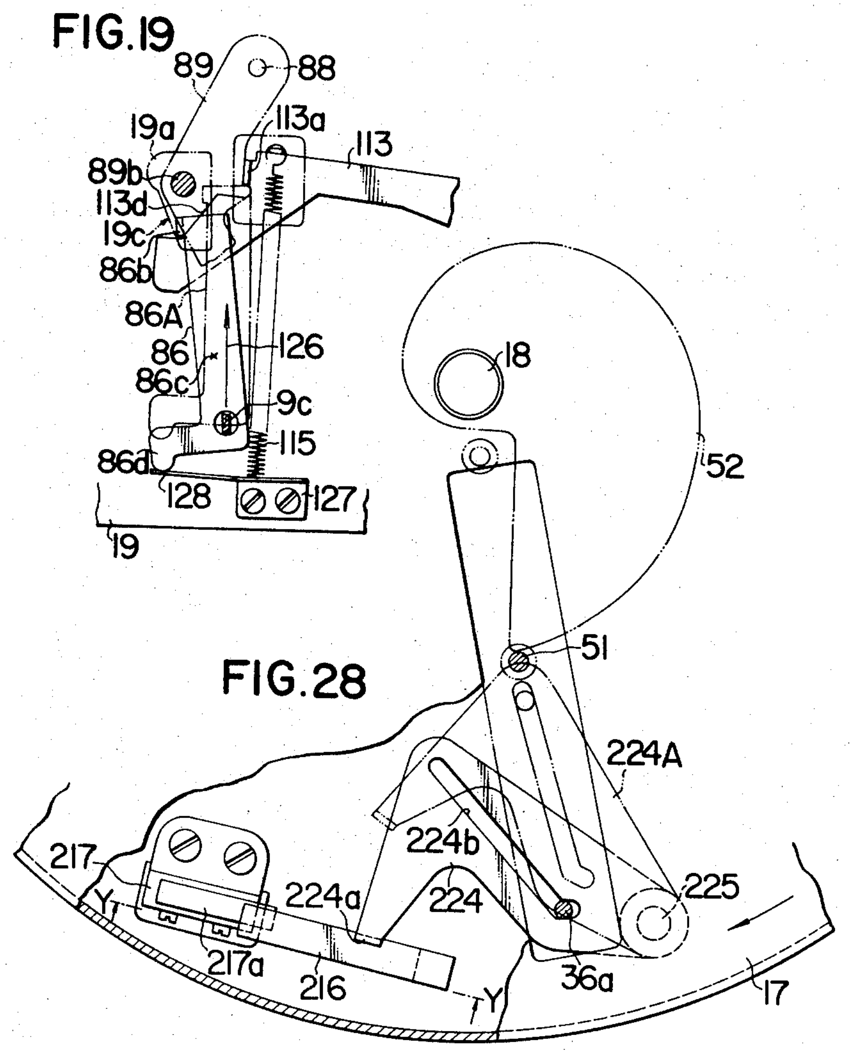
FIG. 19 is a further plan view showing a portion of the turntable control mechanism comprising a slider.
FIG. 28 is a plan view showing the portions of the automatic turntable stopping mechanism built in the turntable.

As shown in FIG. 15 and aforementioned, bent portion 86*b* formed in the upper part of slider 86 extends through opening 19*a* formed in main mounting plate 19 to be disposed below the underside of plate 19. If recording and reproducing button 9 is depressed to have bent portion 113*a* of actuation member 113 locked by offset portion 89*a* of locking member 89 and then button 9 is released, button 9 will be restored to its original position by the biasing force of spring 85. As slider 86 is restored to its original position together with button 9, bent portion 86*b* thereof moves along an inclined edge 113*d* of actuation member 113 as shown in FIG. 19, with a result that slider 86 moves from a dash-and-dot line position 86A shown in which it is disposed perpendicularly to a solid line position in which it is tilted as shown in FIG. 19. This shifting of slider 86 to an inclined position is effected to change the direction of slider 86 and causes the same to stand by to unlock actuation member 113 from locking member 89 as presently to be described.

When slider 86 is in its dash-and-dot line position 86A in FIG. 19, the center 86*c* of frictional dragging of slider 86 on main mounting plate 19 is substantially disposed on an arrow 126 containing a lower end 9*c* of lever 9 best shown in FIG. 17. If slider 86 is tilted as shown in FIG. 19, center 86*c* of frictional dragging will be displaced leftwardly of arrow 126. If button 9 is operated and a force directed in the direction of arrow 126 is exerted on slider 86 when slider 86 is in such state, slider 86 will move such that it moves toward the side on which there is the center of frictional dragging or its tilting to the left is increased. As a result, slider 86 moves leftwardly upwardly while bent portion 86*b* thereof is maintained in contact with a left edge 19c of opening 19a. Thus, slider 86 is kept from abutting against the bent portion 113a of actuation member 113 when button 9 is operated again.

A pin 89b is attached to the underside of locking member 89 as shown in FIG. 19. When button 9 is operated again (i.e. while the turntable is rotating), slider 86 is brought into abutment with pin 89b and causes locking member 89 to pivot clockwise about shaft 99. It will thus be seen that actuation member 113 is released, when button 9 is operated again, from engagement with the offset portion 89a of locking member 89 with which member 113 was brought into engagement when button 9 was initially operated, and that member 113 is restored to its original position by the biasing force of spring 115.

Restoration of actuation member 113 to its original position opens the switch 123 shown in FIG. 16, thereby interrupting rotation of electric motor 125 shown in FIG. 3 and moving idlers 103 and 107 shown in FIG. 15 away from capstan 124. This removes an inertial drive force of the electric motor acting on turntable 17. At the same time, brakes 92 and 97 are restored from their positions shown in FIG. 18 to their positions shown in FIG. 15 in slaved relation to restoration of actuation member 113, with the result that brake shoes 93 and 97 are brought into pressing engagement with the outer peripheral surface 17a of turntable 17 to interrupt its rotation at once.

When the force exerted on button 9 in the second depression operation is removed or when slider 86 moves to its position shown in FIG. 19 after it has pushed and moved pin 89a of locking member 89, a projection 86d provided in the lower portion of slider 86 impinges on a plate spring 128 secured by screws 127 to mounting plate 19, so that slider 86 is moved from its position shown in FIG. 19 to its original position shown in FIG. 15. If button 9 is operated again or in the third depression operation, the recording or reproducing operation can be restarted where it has been interrupted as aforementioned.

Slider 86 shown in FIG. 19 can positively move leftwardly upwardly when the recording and reproducing apparatus is disposed on the horizontal as shown in FIG. 1. However, if the apparatus is used while being maintained in an inclined position with its left portion being moved upwardly, the front end of slider 86 may fail to kick pin 89a of locking member 89 when button 9 is operated in the second depression operation, due to the fact that a clockwise moment centered on the lower end 9c of the lever acts on slider 86.

Figures 20, 21:
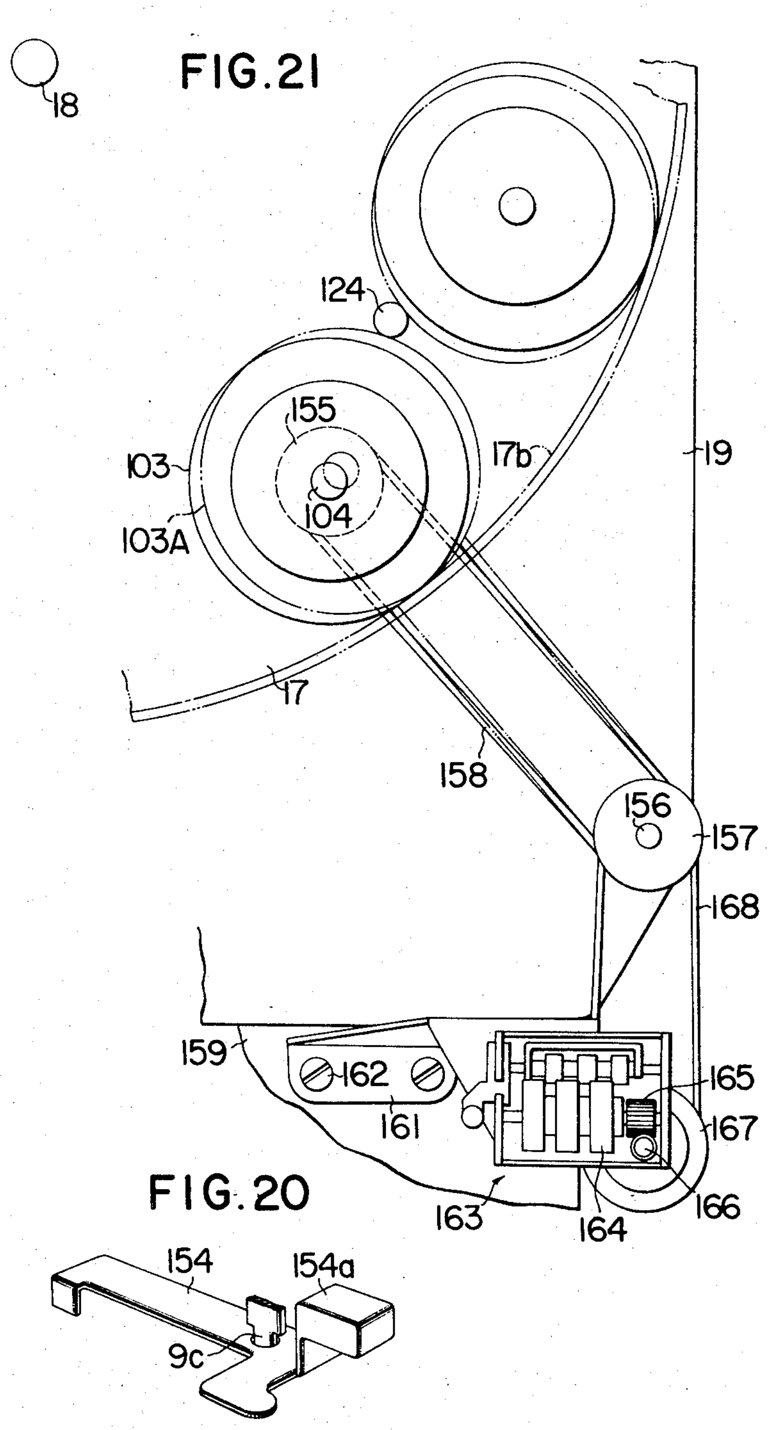
FIG. 20 is a perspective view of the slider of another form of the control mechanism of FIGS. 18 and 19.
FIG. 21 is a plan view of the counter operating mechanism.

In order to avoid the occurrence of the aforementioned state, a balance weight 154a may be provided at one end of a slider 154 as shown in FIG. 20 so as to balance the moment about lower end 9c while keeping weight 154a away from main mounting plate 19. By this arrangement, pivoting of slider 154 can be avoided because of the fact that the moment about lower end 9c of the lever is balanced even if the recording and reproducing apparatus is operated while being maintained in an inclined position. Besides, since the center of frictional dragging is disposed leftwardly of line 126 of force as is the case with slider 86 of FIG. 19, the slider positively moves leftwardly upwardly so as to unlock actuation member 113 from locking member 89.

NUMBER-OF-REVOLUTIONS INDICATION COUNTER

FIG. 21 is a plan view showing the drive mechanism for a counter for indicating the number of revolutions of turntable 17. An endless belt 158 made of a stretch material is trained about a pulley 155 substantially integral with idler 103 and a pulley 157 mounted on main mounting plate 19 through a shaft 156 and formed with two peripheral grooves. A support table 161 is connected by screws 162 to a mounting plate 159 secured to main mounting plate 19. A counter generally designated 163 is secured to support table 161. Counter 163 comprises graduated discs 164 for indicating the number of revolutions of turntable 17 which are operated by a worm wheel 165 maintained in engagement with a worm 166 to which a pulley 167 is secured. An endless belt 168 is trained about pulleys 157 and 167.

Idler 103, which is maintained in contact with the inner peripheral surface 17b of turntable 17 at all times as aforementioned, moves to the dash-and-dot line position 103A shown in FIG. 15 when recording and reproducing button 9 shown in FIG. 17 is operated, in which position it presses against capstan 124 so as to transmit the rotation of capstan 124 to turntable 17.

This drive mechanism is characterized by the fact that the shaft 156 of pulley 157 is disposed substantially on an extension of a line connecting shaft 18 of turntable 17 to shaft 104 of idler 103. Because of this arrangement, the distance between the shaft 104 of idler 103 and shaft 156 of pulley 157 shows substantially no change when idler 103 moves from its solid line position to its dash-and-dot line position 103A. This is effective to minimize the rate of change of endless belt 158 during the time idler 103 operates.

In conventional drive mechanisms in which idler 103 is moved away from both capstan 124 and turntable 17 for interrupting the rotation of turntable 17, turntable 17 tends to rotate slightly due to inertia till brake means is fully operated, in spite of the fact that idler 103 has stopped rotating and counter 163 has stopped counting. As a result, it often happens that there is a discrepancy between the actual number of revolutions and the value indicated by the counter. This disadvantage of conventional drive mechanisms can be obviated by the aforementioned arrangement in which shafts 18, 104 and 156 are disposed on a substantially straight line. This arrangement is effective to maintain idler 103 in contact with turntable 17 at all times while permitting to minimize the length of endless belt 158. As a result, any small amount of rotation of the turntable can be counted on the counter.

RECORDING OPERATION

As aforementioned, the information or sound recorded on a magnetic sheet can be reproduced by depressing recording and reproducing button 9 shown in FIG. 15, and playback of the sound can be interrupted by depressing button 9 again. When information or sound is to be recorded on a magnetic sheet, it is required to depress recording button 13 as well as recording and reproducing button 9.

Figures 22, 23:
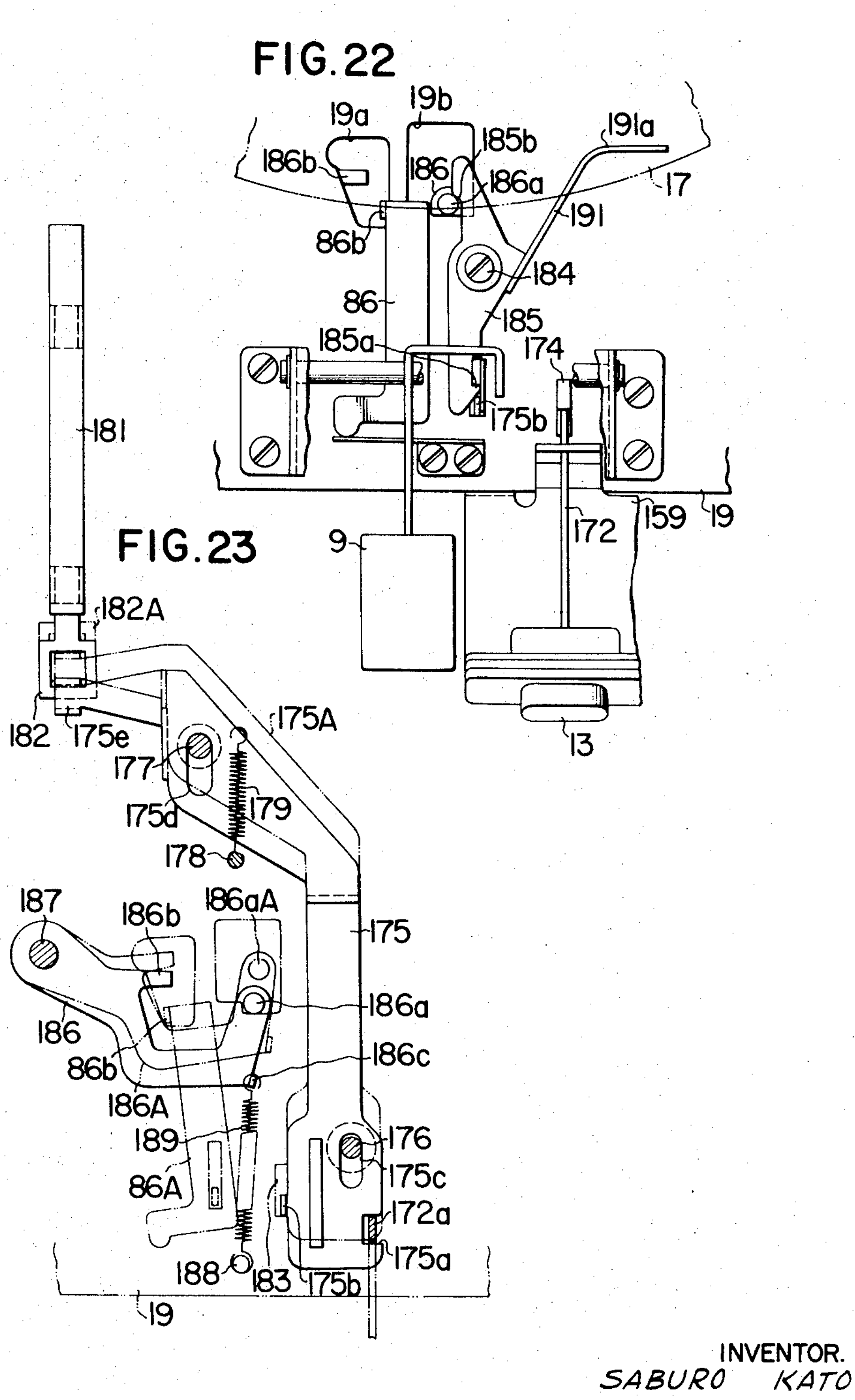
FIG. 22 is a plan view showing the mechanism for performing a recording operation.
FIG. 23 is a further plan view showing the mechanism for performing a recording operation.
Figures 24, 25:
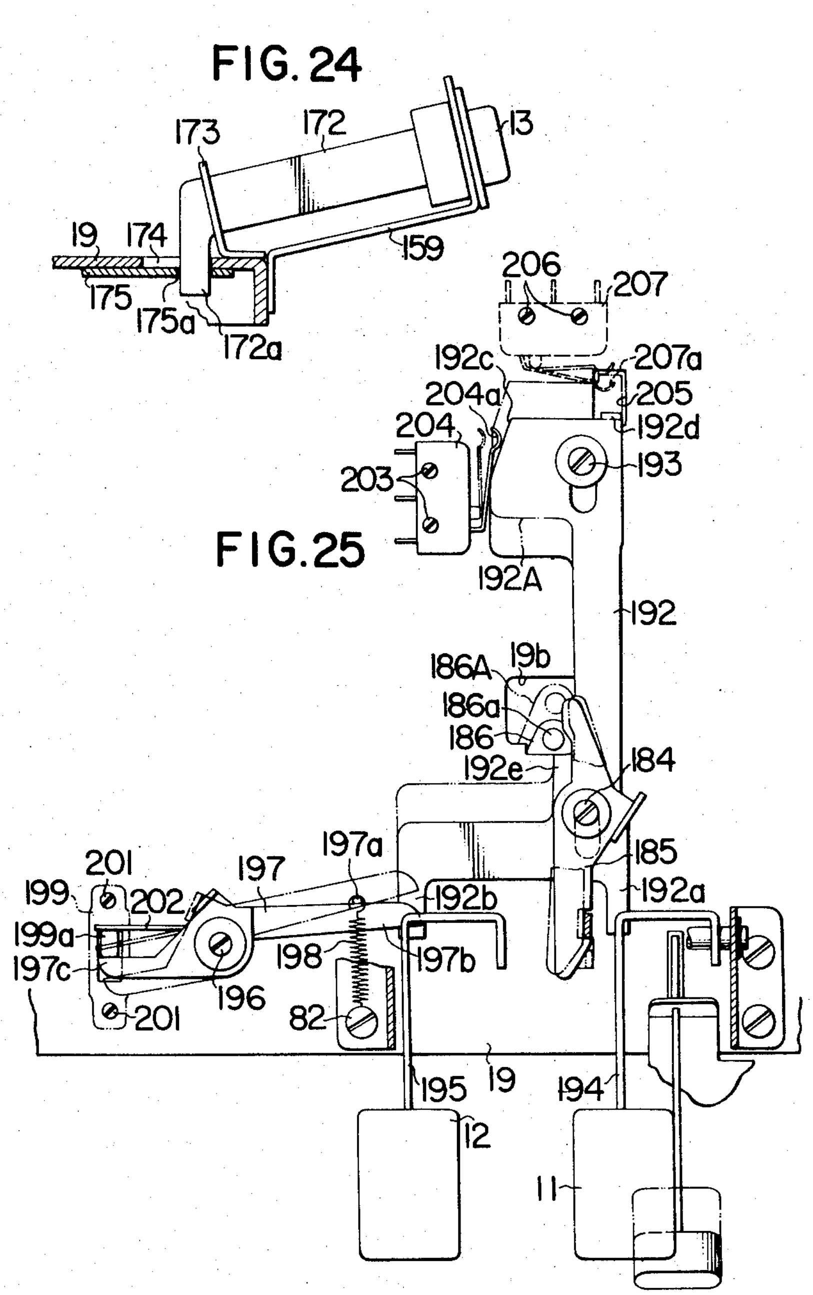
FIG. 24 is a side view of the pushbutton for initiating a recording operation.
FIG. 25 is a plan view of the turntable quick feed and reverse rotation mechanism.

Recording button 13 is mounted on mounting plate 159 secured to main mounting plate 19 as shown in FIG. 22. Button 13 has attached thereto an arm 172 which loosely extends through a guide 173 secured to main mounting plate 19 as shown in FIG. 24. Arm 172 has a forward end portion 172*a* which extends through an opening 174 formed in main mounting plate 19 and is loosely received in a cutout 175*a* formed in an actuation member 175 which is mounted on the underside of main mounting plate 19 through shafts 176 and 177 attached to plate 19 and loosely extending through slots 175*c* and 175*d* respectively as shown in FIG. 23. Actuation member 175 is urged to move downwardly in FIG. 23 by the biasing force of a compression spring 179 connected at one end thereof to a pin 178 attached to plate 19 and at the other end thereof to member 175.

A fork 175*e* provided at the upper portion of actuation member 175 is received in an actuator 182 of a changeover switch 181 for switching between recording and playback. A bent portion 175*b* formed in the lower portion of member 175 extends through an opening 183 formed in plate 19 to be disposed above the upper surface of plate 19. A locking member 185 mounted on main mounting plate 19 through a shaft 184 as shown in FIG. 22 is urged to pivot counterclockwise about shaft 184 by the biasing force of a spring (not shown). Locking member 185 has a hook 185*a* which presses, at its back side, against the bent portion 175*b* of actuation member 175. A pin 186*a* attached to an unlocking member 186 is positioned against an offset portion 185*b* formed in the upper portion of locking member 185. Unlocking member 186, which is pivotally connected to the underside of plate 19 through a shaft 187, is urged to pivot clockwise about shaft 187 by the biasing force of a compression spring 189 connected at one end thereof to a pin 188 attached to plate 19 and at the other end thereof to a bent portion 186*c* of unlocking member 186.

If the recording button 13 shown in FIG. 22 is depressed, the actuation member 175 shown in FIG. 23 will be pushed by the front end 172*a* of arm 172 to move to a dash-and-dot line position 175A. By this movement of member 175, actuator 182 is pushed into the interior of change-over switch 181 for switching between recording and playback as shown by dash-and-dot lines 182A, thereby bringing switch 181 to a recording position. As actuation member is operated, the bent portion 175*b* thereof is locked by the hook 185*a* of locking member 185 shown in FIG. 22, so that member 175 is maintained in the dash-and-dot line position 175A shown in FIG. 23. Thus the mechanism is ready for a recording operation.

If recording and reproducing button 9 is depressed at this time, turntable 17 rotates as described with reference to FIG. 15 and magnetic head 8 mounted thereon as shown in FIG. 2 rotates in a spiral path and moves toward the center of turntable 17, so that information or sound can be recorded on magnetic sheet 3 shown in FIG. 1. The aforementioned recording operation is performed when recording and reproducing button 9 is depressed after recording button 13 is depressed first. A recording operation can also be performed by depressing button 9 first for rotating turntable 17 and then depressing recording button 13 for bringing the change-over switch 181 shown in FIG. 23 to a recording position. While a recording operation is being performed or turntable 17 is rotating, slider 86 associated with button 9 stands by in the dash-and-dot line position 86A shown in FIG. 23.

INTERRUPTION OF RECORDING OPERATION

A recording operation can be interrupted by operating button 9 again. If button 9 is depressed when slider 86 is in an inclined position as shown in FIG. 19, the pin 89*b* of locking member 89 is kicked by slider 86 as aforementioned, whereby rotation of turntable 17 can be interrupted. As slider 86 moves upwardly leftwardly as aforementioned, an arm 186*b* of unlocking member 186 will be pushed upwardly by the bent portion 86*b* of slider 86 as shown in FIG. 23. When unlocking member 186 is pivoted to a dash-and-dot line position 186A against the biasing force of spring 189, offset portion 185*b* of locking member 185 shown in FIG. 22 is kicked by pin 186*a* of member 186, so that locking member 185 pivots clockwise against the biasing force of a spring (not shown), thereby unlocking the bent portion 175*b* of actuation member 175 shown in FIG. 23.

As actuation member 175 is restored from its dash-and-dot line position 175A to its solid line position by the biasing force of spring 179, actuator 182 is pulled out from its dash-and-dot line position 182A to its solid line position, so that change-over switch 181 is released from the recording position.

The description set forth hereinabove refers to the interruption of a recording operation effected at any point in time as desired by operating button 9 again. When magnetic head 8 shown in FIG. 2 has moved to its final position and recording of information on magnetic sheet 3 shown in FIG. 1 has been completed, the recording mechanism shown in FIGS. 22 and 23 is automatically rendered inoperative.

AUTOMATIC STOPPING OF RECORDING OPERATION

In FIG. 22, a release arm 191 extends obliquely from a side edge of locking member 185 and has a bent forward end portion 191*a* which is disposed immediately below the path of pivotal movement of free end 53*c* shown in FIG. 3 of operation lever 53 described with reference to FIG. 2. When the magnetic head 8 shown in FIG. 2 has reached its final position and the bent portion 42*a* of elevational plate 42 is scooped by the bent portion 53*a* of operation lever 53, the free end 53*c* of operation lever 53 disposed on the opposite side to bent portion 42*b* moves downwardly to a level at which it can abut the free end 191*a* of release arm 191. If turntable 17 rotates clockwise in FIG. 3 at this time, release arm 191 will be kicked by the free end 53*c* of operation lever 53 and the locking member 185 shown in FIG. 22 will pivot clockwise. The aforesaid pivotal movement of locking member 185 unlocks the actuation member 175 shown in FIG. 23 from hook 185*a* of locking member 185, so that member 175 is restored to its original position. Thus the recording operation is interrupted as aforementioned.

To sum up, if recording button 13 and recording and reproducing button 9 are both operated, a recording operation can be performed regardless of the order in which the two buttons are operated. If button 9 is operated again at any point in time as desired, the recording operation can be interrupted. When magnetic head 8 reaches the final position for recording, the recording operation is automatically terminated by the action of operation lever 53. When the recording operation is terminated automatically, the rotation of turntable 17 is also automatically interrupted. The automatic interruption of rotation of turntable 17 will further be described hereinafter.

QUICK FEED AND REVERSE ROTATION OF TURNTABLE

An actuation member 192 shown in FIG. 25 is adapted to open and close a switch for rotating turntable 17 at high speed and slidably mounted on main mounting plate 19 through shafts 193 and 184. Quick feed button 11 for feeding turntable 17 quickly and reverse rotation button 12 for reversing the direction of rotation of turntable 17 are of the same construction as the recording and reproducing button 9 shown in FIG. 17. Connected to buttons 11 and 12 are levers 194 and 195 respectively which have free ends corresponding to the free end 9*c* of lever 9*a* shown in FIG. 17 and positioned against end edges of arms 192*a* and 192*b* respectively which are provided at the lower end of actuation member 192.

A change-over lever 197 pivotally connected to main mounting plate 19 through a shaft 196 is normally urged to pivot clockwise about shaft 196 by the biasing force of a compression spring 198 connected at one end thereof to screw 82 and at the other end thereof to a bent portion 197*a* of change-over lever 197. Change-over lever 197 is urged by spring 198 to press at its left end portion 197*b* against a free end of lever 195. A reverse rotation switch 199 is secured to the underside of main mounting plate 19 by screws 201 and has a knob 199*a* which projects upwardly to be disposed above the upper surface of plate 19 as shown. Knob 199*a* is held between a left end portion 197*c* of change-over lever 197 and a plate spring 202 secured to lever 197.

An actuation lever 204*a* for a change-over switch 204 for high speed operation secured to main mounting plate 19 by screws 203 is positioned against a side edge 192*c* of actuation member 192. Actuation member 192 has a bent portion 192*d* which extends through an opening 205 formed in plate 19 to be disposed below the underside of plate 19. A mute switch 207 secured to the underside of plate 19 by screws 206 is intended to remove noises which might otherwise be produced when magnetic head 8 is fed quickly or the direction of its rotation is reversed. An actuation lever 207*a* for mute switch 207 is disposed against bent portion 192*d* of actuation member 192.

If quick feed button 11 is operated to move actuation member 192 upwardly in FIG. 23, quick feed switch 204 and mute switch 207 will be both actuated. Upon actuation of quick feed switch 204, the electric motor 125 shown in FIG. 3 rotates at high speed and rotates the turntable 17 shown in FIG. 2 at high speed in the direction of arrow A, so that magnetic head 8 is fed quickly toward the center of the turntable.

On the other hand, if reverse rotation button 12 is operated, change-over lever 197 will pivot counterclockwise and knob 199*a* will be moved downwardly by plate spring 202, thereby reversing the direction of rotation of the electric motor shown in FIG. 3. At the same time, actuation member 192 moves to a dash-and-dot line position 192A, so that magnetic head 8 rotates at high speed in the same manner as when quick feed button 11 is operated but the direction of its rotation is reversed.

When quick feed button 11 and reverse rotation button 12 are operated, an offset portion 192*e* of actuation member 192 pushes upwardly, the pin 186*a* of unlocking member 186 extending through opening 19*b*, so that if buttons 11 and 12 are released after buttons 11 and 12 are depressed, the spring 189 of unlocking member 186 shown in FIG. 23 will return buttons 11 and 12 to their original positions by its biasing force.

Locking member 185 pivots to its dash-and-dot line position when actuation member 192 is actuated to move the pin 186*a* of unlocking member 186 to its dash-and-dot line position 186*a*A. Thus, if quick feed button 11 or reverse rotation button 12 is operated while a recording operation is being performed, actuation member 175 is restored to its original position as explained with reference to FIG. 23, so that the recording operation is interrupted.

It is necessary that the rotation of magnetic head 8 be automatically interrupted when the magnetic head has reached its final position in a recording operation, reproducing operation or quick feed operation or the rotation of magnetic head in the reverse direction has been finished. The automatic magnetic head-stopping mechanism will now be explained with reference to FIG. 26 et seq.

AUTOMATIC MAGNETIC HEAD-STOPPING MECHANISM

Figure 26:
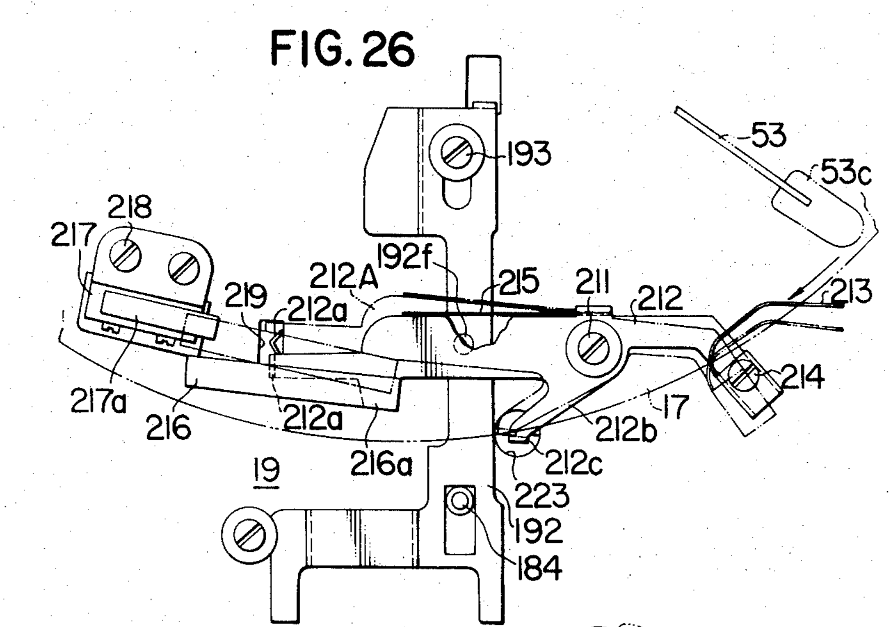
FIG. 26 is a plan view of the automatic turntable stopping mechanism.

In FIG. 26, an automatic stopping set lever 212 pivotally connected to main mounting plate 19 through a shaft 211 is designed to act as a switch for stopping turntable 17 when magnetic head 8 has reached its final position. Connected to the right end of set lever 212 by a screw 214 is an actuation arm 213 which, like the release arm 191 shown in FIG. 22, is disposed in the path of movement of the free end 53*c* of operation lever 53 shown in FIG. 26 when the free end has moved downwardly toward the surface of turntable 17. Actuation member 192 has attached thereto a pin 192*f* which moves set lever 212 to a dash-and-dot line position 212A through a plate spring 215 secured at its base to set lever 212 when member 192 is actuated. Set lever 212 has secured thereto a base 216*a* of a plate spring 216.

Figure 29:
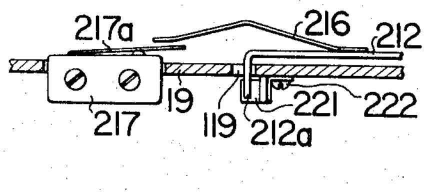
FIG. 29 is a sectional view taken along the line Y—Y of FIG. 28.

If set lever 212 is pivoted to its dash-and-dot line position 212A by the action subsequently to be described, it will be disposed above an actuator 217*a* of a switch 217 as shown in FIG. 29. If switch 217 which is secured to main mounting plate 19 is actuated, solenoid 91 will be energized as shown in FIG. 15. Set lever 212 is formed at its left end with a bent portion 212*a* which extends through an opening 219 formed in plate 19 to come into contact with an elevated portion 221*a* of a retainer spring 221 shown in FIG. 27. Spring 221 is secured to the underside of plate 19 by screws 222 as shown in FIG. 29. An arm 212*b* provided in the central portion of set lever 212 has a bent portion 212*c* which extends through an opening 223 formed in plate 19 to be positioned against the lower side edge of actuation member 113 below the underside of plate 19.

In FIG. 28, a stop lever 224 is pivotally connected at its base to the underside of turntable 17 through a shaft 225. The shaft 36*a* shown in FIG. 4 is loosely received in a slot 224*b* formed in stop lever 224. Shaft 36*a* projects downwardly from, and moves with, table 31.

When magnetic head 8 reaches its final position after completion of a recording operation or reproducing operation, the free end 53*c* of operation lever 53 shown in FIG. 26 kicks arm 213 to move set lever 212 to the dash-and-dot line position 212A as the free end moves in the direction an arrow. Set lever 212 is held in the dash-and-dot line position 212A after the bent portion 212*a* of set lever 212 rides, as shown in dash-and-dot lines 212*a*A in FIG. 27, over the elevated portion 221*a* of plate spring 221.

On the other hand, movable table 31 is restored to its starting position when the shaft 51 of elevational plate 42 shown in FIG. 2 is pushed outwardly by restoration plate 52. At this time, stop lever 224 is returned from its dash-and-dot line position 224A to its solid line position in FIG. 28 by the shaft 36*a* attached to movable plate 31.

As turntable 17 rotates, a bent portion 224*a* of stop lever 224 pushes plate spring 216 so as to thereby actuate automatic stopping switch 217 which energizes the solenoid 91 shown in FIG. 15 to pull locking member 89, thereby unlocking actuation member 113 shown in FIG. 15. Unlocking of actuation member 113 results in interruption of rotation of electric motor 125 shown in FIG. 3, releasing of idlers 103 and 107 and actuation of brakes 92 and 97 as aforementioned.

Figure 27:
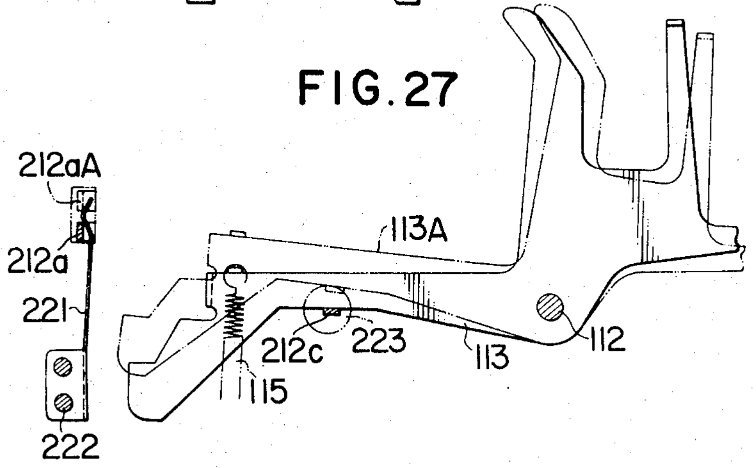
FIG. 27 is a further plan view of the automatic turntable stopping mechanism.

When actuation member 113 returns from its dash-and-dot line position 113A to its solid line position as shown in FIG. 27, it pushes the bent portion 212*C* of set lever 212, so that set lever 212 is restored to its original position shown in FIG. 26. Rotation of turntable 17 is interrupted as aforementioned when a recording operation is completed. When a recording operation is completed, the operation lever 53 shown in FIG. 26 kicks release arm 191 shown in FIG. 22 to thereby finish the recording operation as aforementioned in addition to interruption of rotation of turntable 17.

If the quick feed button 11 shown in FIG. 25 is operated to actuate actuation member 192, the pin 192*f* shown in FIG. 26 will push plate spring 215 upwardly to move set lever 212 to the switch actuation position 212A shown in dash-and-dot lines. Upon completion of quick feed, switch 217 is actuated in the same manner as when playback is completed so as to automatically stop turntable 17. When the reverse rotation button 12 shown in FIG. 25 is operated, the set lever 212 shown in FIG. 26 is moved to the dash-and-dot line position 212A as when quick feed button 11 is operated, and the stop lever 224 shown in FIG. 28 pushes plate spring 216 clockwise which is not the case when quick feed button is operated. Actuation of switch 217 automatically stops turntable 17 and sets magnetic head 8 at a starting position in the same manner as when quick feed button is operated.

It is to be understood that the invention is not limited to the features and embodiments hereinabove specifically set forth, but may be carried out in other ways without departure from its spirit.

What is claimed is:

1. Magnetic recording and reproducing apparatus comprising, in combination,
   a. means for holding a magnetic recording sheet in a fixed, downwardly facing position;
   b. a magnetic head disposed beneath said fixed position for contact with said sheet;
   c. means, including a turntable, for advancing said magnetic head along a spiral path of progressively decreasing radius in contact with said sheet;
   d. means for imparting drive to said turntable, including an actuation member displaceable between first and second positions for respectively applying drive to and stopping said turntable, said actuation member being locked when in said first position,
   e. a manually depressible control button; and
   f. a slider connected to said button for inward movement in one of two alternate paths upon depression of said button, and for outward movement upon release of said button, said slider engaging said actuation member at the second position thereof and displacing said actuation member to the first, locked position thereof during inward movement of said slider in a first of said paths, said slider unlocking said member from said first position for return to said second position during inward movement of the slider in the other of said paths;
   g. said actuation member having a portion shaped and disposed to engage and guide said slider, for positioning said slider for subsequent inward movement in said other path, during outward movement of said slider upon release of said button when said actuation member is disposed in said first position, said slider moving outwardly to a position for subsequent inward movement in said first path when said actuation member is disposed in said second position.

2. Apparatus as defined in claim 1, wherein said actuation member portion has an inclined edge for guiding said slider for outward movement in tilted relation to said first path until said slider abuts and is stopped by said portion in a position for inward movement of said slider in said other path upon the next subsequent depression of said button, said other path being tilted in relation to said first path.

3. Apparatus as defined in claim 2, including a mounting plate having an upper surface, said slider being disposed for sliding movement on said upper surface and having a center of frictional drag which is substantially aligned with the direction of force applied to said slider by depression of said button when said slider is positioned for movement in said first path such that the first path is substantially aligned with said direction of applied force, said center of frictional drag being displaced sidewardly of said direction of applied force when said slider is positioned for movement in said second path such that the second path is angularly displaced from said first path in the direction of displacement of said center of frictional drag.

4. Apparatus as defined in claim 1, including a mounting plate, means for mounting said actuation member thereon for pivoted movement between said first and second positions, and a locking member pivotable into and out of a position for receiving and locking said actuation member in said first position, said actuation member having a portion disposed in said first path for engagement by said slider when said actuation member is in said second position, and said locking member having a portion disposed in said other path for engagement by said slider to pivot said locking member to unlock said actuation member from said first position.

5. Apparatus as defined in claim 4, including means for restoring said actuation member to said second position upon release thereof from said first position, means for restoring said locking member to the locking position after pivoting thereof by said slider, and means for restoring said slider to position for inward movement in said first path after outward movement of said slider from said second path.

6. Apparatus as defined in claim 4, including drive means comprising a rotary driven member for rotating said turntable, and wherein said drive-imparting means further comprises i. transmission means for connecting said driven member to, and disconnecting said driven member from, said turntable in response to movement of said actuation member to said first and second positions, respectively, and ii. brake means for releasing and frictionally arresting said turntable in response to movement of said actuation member to said first and second positions, respectively.

7. Apparatus as defined in claim 6, wherein said transmission means includes a rotary idler movable into and out of edgewise engagement with said driven member, in response to movement of said actuation member as aforesaid, while remaining continuously in edgewise engagement with said turntable; and further including a counter comprising:

i. a pulley having an axis disposed substantially in a straight line connecting the axes of said idler and said turntable;

ii. endless belt means for transmitting rotary motion of said idler to said pulley; and iii. means driven by said pulley for counting and indicating the number of revolutions of said turntable.

8. Apparatus as defined in claim 7, wherein said head-advancing means includes means for moving said head progressively toward the center of the turntable as the turntable rotates, and means for restoring the head to an initial outward position on the turntable after inward movement of the head as aforesaid, and further including automatic turntable-stopping mechanism comprising:

i. a stop lever pivotally mounted on the underside of said turntable for pivotal movement to a stop position in response to outward movement of said head by said restoring means;

ii. a switch for stopping rotation of said turntable by actuating said locking member to release said actuation member from said first position; and iii. a set lever pivotally mounted on said mounting plate and bearing an actuation arm at one end and a plate spring at the other end, said actuation arm being disposed for engagement by a portion of said head-advancing means upon completion of inward advance of the head, for pivoting said set lever to a position at which said plate spring is adjacent said switch and in the path of advance of the stop position of the stop lever carried by the turntable for depression of the plate spring by the stop lever to actuate the switch.

9. Magnetic recording and reproducing apparatus comprising, in combination, a. means for holding a magnetic recording sheet in a fixed position;

b. a magnetic head;

c. means, including a turntable, for advancing the magnetic head along an inwardly directed spiral path in contact with the sheet;

d. means, including a rotary driven member, for rotating the turntable;

e. means, including a rotary idler shiftable into and out of engagement with said driven member while remaining continuously in engagement with said turntable, for connecting and disconnecting said turntable and driven member;

f. a pulley having an axis disposed substantially on a straight line connecting the axes of said idler and turntable;

g. endless belt means for transmitting rotary motion of said idler to said pulley; and h. means driven by said pulley for counting and indicating the number of revolutions of said turntable.

10. Magnetic recording and reproducing apparatus comprising, in combination, a. means for holding a magnetic recording sheet in a fixed, downwardly facing position;

b. a magnetic head disposed beneath said fixed position for contact with said sheet;

c. means for advancing said magnetic head along a spiral path of progressively decreasing radius in contact with said sheet, said means including i. a rotatably driven turntable, ii. means for moving said head progressively toward the center of the turntable as the turntable rotates, and iii. means for restoring the head to an initial outward position on the turntable after inward movement of the head as aforesaid;

d. a mounting plate disposed beneath said turntable;

e. a stop lever pivotally mounted on the underside of said turntable for pivotal movement to a stop position in response to outward movement of said head by said restoring means;

f. a switch for stopping rotation of said turntable; and g. a set lever pivotally mounted on said mounting plate and bearing an actuation arm at one end and a plate spring at the other end, said actuation arm being disposed for engagement by a portion of said head-advancing means upon completion of inward advance of the head, for pivoting said set lever to a position at which said plate spring is adjacent said switch and in the path of advance of the stop position of the stop lever carried by the turntable for depression of the plate spring by the stop lever to actuate the switch.

* * * * *